United States Patent
Jang et al.

(10) Patent No.: US 12,301,015 B2
(45) Date of Patent: May 13, 2025

(54) REAL-TIME APPROXIMATION METHOD AND APPARATUS OF MUTUAL INDUCTANCE BETWEEN TRANSMITTERS AND RECEIVERS FOR DETERMINING OPTIMAL OPERATING CONDITION IN MULTIPLE-RECEIVER WIRELESS POWER TRANSFER SYSTEMS

(71) Applicant: Korea Advanced Institute of Science and Technology, Daejeon (KR)

(72) Inventors: In Gwun Jang, Daejeon (KR); Mingi Kim, Daejeon (KR); Minseok Kang, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 200 days.

(21) Appl. No.: 17/752,349

(22) Filed: May 24, 2022

(65) Prior Publication Data

US 2023/0216344 A1   Jul. 6, 2023

(30) Foreign Application Priority Data

Jan. 4, 2022   (KR) .......................... 10-2022-0000986

(51) Int. Cl.
*H02J 50/12* (2016.01)
*H02J 50/40* (2016.01)
*H02J 50/80* (2016.01)
*H02J 50/90* (2016.01)

(52) U.S. Cl.
CPC .............. *H02J 50/12* (2016.02); *H02J 50/40* (2016.02); *H02J 50/80* (2016.02); *H02J 50/90* (2016.02)

(58) Field of Classification Search
CPC .. H02J 50/12; H02J 50/40; H02J 50/80; H02J 50/90
See application file for complete search history.

(56) References Cited

U.S. PATENT DOCUMENTS

| | | | |
|---|---|---|---|
| 2014/0266029 A1* | 9/2014 | Telefus | H02J 50/10 320/108 |
| 2015/0236526 A1* | 8/2015 | Jadidian | H02J 50/90 320/108 |
| 2020/0177033 A1* | 6/2020 | Jang | H02J 50/12 |

FOREIGN PATENT DOCUMENTS

| | | |
|---|---|---|
| CN | 109995121 A | 7/2019 |
| KR | 20160089778 A | 7/2016 |
| KR | 20170055595 A | 5/2017 |
| KR | 20190129270 A | 11/2019 |

(Continued)

*Primary Examiner* — Rexford N Barnie
*Assistant Examiner* — Joseph N Inge
(74) *Attorney, Agent, or Firm* — CHRISTENSEN O'CONNOR JOHNSON KINDNESS PLLC

(57) ABSTRACT

The embodiments relate to a real-time approximation method and apparatus of a mutual inductance between transmitters and receivers for determining an optimal operating condition in a multiple-receiver wireless power transfer system, and it may be configured to approximate a mutual inductance in the multiple-receiver wireless power transfer system according to a configuration status of the receivers, and determine an operating condition of the multiple-receiver wireless power transfer system based on the mutual inductance. According to the various example embodiments, the inductance may comprise a mutual inductance between the transmitter and the receivers, and a mutual inductance between the receivers.

9 Claims, 10 Drawing Sheets

(56) References Cited

FOREIGN PATENT DOCUMENTS

| KR | 102155807 | B1 | 9/2020 |
| KR | 20210034282 | A | 3/2021 |

* cited by examiner

| Rx | Center position |
|---|---|
| Rx1 Coil : $(x_1, y_1, z_1) = (0.0, -40.0, 10.0)$ | |
| Rx2 Coil : $(x_2, y_2, z_2) = (0.0, 40.0, 10.0)$ | |

(a)

| Mutual inductance | Approximated value | Actual value | Error rate |
|---|---|---|---|
| Tx-Rx1 | 18.73uH | 18.51uH | 1.19% |
| Tx-Rx2 | 19.20uH | 19.12uH | 0.42% |
| Rx1-Rx2 | -0.90uH | -0.89uH | 1.12% |

(b)

| Rx | Center position |
|---|---|
| Rx1 Coil | $(x_1, y_1, z_1) = (0.0, -70.0, 10.0)$ |
| Rx2 Coil | $(x_2, y_2, z_2) = (60\cos30°, 60\sin30°, 10.0)$ |

(a)

| Mutual inductance | Approximated value | Actual value | Error rate |
|---|---|---|---|
| Tx-Rx1 | 8.14uH | 7.91uH | 2.91% |
| Tx-Rx2 | 11.67uH | 11.76uH | 0.77% |
| Rx1-Rx2 | -0.27uH | -0.28uH | 3.57% |

(b)

| Rx | Center position |
|---|---|
| Rx1 Coil | $(x_1, y_1, z_1) = (0.0, -70.0, 10.0)$ |
| Rx2 Coil | $(x_2, y_2, z_2) = (60\cos 30°, 60\sin 30°, 10.0)$ |
| Rx3 Coil | $(x_3, y_3, z_3) = (50\cos 120°, 50\sin 120°, 10.0)$ |

(a)

| Mutual inductance | Approximated value | Actual value | Error rate |
|---|---|---|---|
| Tx-Rx1 | 8.01uH | 7.91uH | 1.26% |
| Tx-Rx2 | 11.70uH | 11.76uH | 0.51% |
| Tx-Rx3 | 25.73uH | 25.80uH | 0.27% |
| Rx1-Rx2 | -0.29uH | -0.28uH | 3.57% |
| Rx1-Rx3 | -0.50uH | -0.50uH | 0.00% |
| Rx2-Rx3 | -2.03uH | -2.05uH | 0.98% |

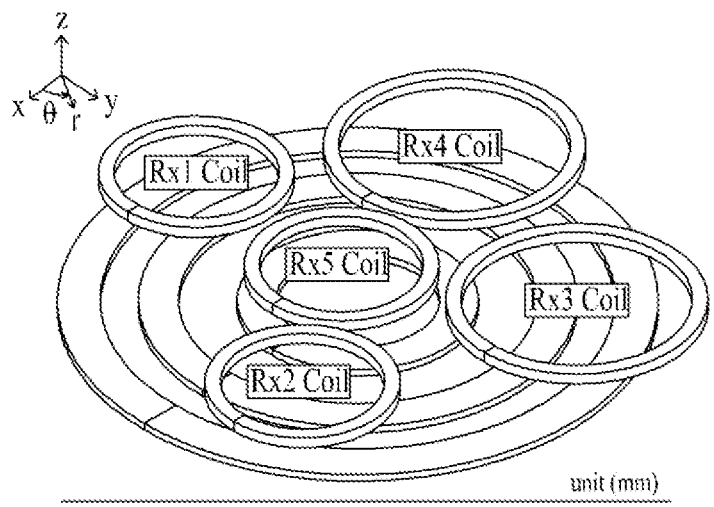

| Rx | Center position |
|---|---|
| Rx1 Coil | $(x_1, y_1, z_1) = (0.0, -70.0, 10.0)$ |
| Rx2 Coil | $(x_2, y_2, z_2) = (65\cos 30°, 65\sin 30°, 10.0)$ |
| Rx3 Coil | $(x_3, y_3, z_3) = (70\cos 120°, 70\sin 120°, 10.0)$ |
| Rx4 Coil | $(x_4, y_4, z_4) = (70\cos 200°, 70\sin 200°, 10.0)$ |
| Rx5 Coil | $(x_5, y_5, z_5) = (5\cos 315°, 5\sin 315°, 10.0)$ |

(a)

| Mutual inductance | Approximated value | Actual value | Error |
|---|---|---|---|
| Tx-Rx1 | 7.33uH | 7.32uH | 0.01uH |
| Tx-Rx2 | 9.56uH | 9.51uH | 0.05uH |
| Tx-Rx3 | 12.15uH | 12.22uH | 0.07uH |
| Tx-Rx4 | 12.23uH | 12.22uH | 0.01uH |
| Tx-Rx5 | 28.61uH | 28.58uH | 0.03uH |
| Rx1-Rx2 | -0.28uH | -0.24uH | 0.04uH |
| Rx1-Rx3 | -0.21uH | -0.29uH | 0.08uH |
| Rx1-Rx4 | -1.98uH | -1.99uH | 0.01uH |
| Rx1-Rx5 | -2.00uH | -1.93uH | 0.07uH |
| Rx2-Rx3 | -0.91uH | -0.97uH | 0.06uH |
| Rx2-Rx4 | -0.28uH | -0.29uH | 0.01uH |
| Rx2-Rx5 | -2.33uH | -2.37uH | 0.04uH |
| Rx2-Rx4 | -2.68uH | -2.72uH | 0.04uH |
| Rx3-Rx5 | -2.85uH | -2.82uH | 0.03uH |
| Rx4-Rx5 | -3.44uH | -3.44uH | 0.00uH |

(b)

REAL-TIME APPROXIMATION METHOD AND APPARATUS OF MUTUAL INDUCTANCE BETWEEN TRANSMITTERS AND RECEIVERS FOR DETERMINING OPTIMAL OPERATING CONDITION IN MULTIPLE-RECEIVER WIRELESS POWER TRANSFER SYSTEMS

CROSS-REFERENCE TO RELATED APPLICATION(S)

This application claims the priority benefit of Korean Patent Application No. 10-2022-0000986, filed on Jan. 4, 2022, in the Korean Intellectual Property Office, the disclosure of which is incorporated herein in its entirety by this reference.

BACKGROUND

1. Field of the Invention

The various example embodiments relate to a real-time approximation method and apparatus of a mutual inductance between transmitters and receivers for determining an optimal operating condition in a multiple-receiver wireless power transfer system.

2. Description of Related Art

A wireless power transfer is a non-contact power transfer technology in which electric energy supplied to a primary coil (transmitter) induces magnetic field energy, and the induced magnetic field energy induces electric energy again in a secondary coil (receiver). The wireless power transfer is being actively studied, and applied to various product groups, from low-power portable electronic devices to high-power train systems. Currently, the relevant market size is continuously growing. With the continuous growth of the market, the demand for improvement of the wireless power transfer technology is increasing, and recently, technology development and research on multiple-receiver wireless power transfer rather than a single-receiver is active.

In case of the multiple-receiver wireless power transfer, the scalability and convenience of the technology may be increased compared to a single-receiver, but the difficulty of technology is high due to coupling effects of complex receiver coils and different loads of each receiver. Particularly, magnetic resonance type wireless power transfer, which shows high transfer efficiency even in a relatively large air gap, is mainly applied in industry, and a study of magnetic resonance conditions considering multiple-receivers is emerging as an important study topic in the study of multiple-receiver wireless power transfer. The magnetic resonance type multiple-receiver wireless power transfer technology may be classified into three main methods, namely, an impedance matching method, a power electronic system control method, and an optimal resonance condition method. All of these methods may be successfully seen as the multiple-receiver wireless power transfer technology in consideration of high efficiency and power distribution. Particularly, in case of the optimal resonance condition method, it is a method of maximizing efficiency while satisfying all loads by considering the coupling effects (mutual inductance) between all coils.

Unlike the single-receiver wireless power transfer, in the multiple-receiver wireless power transfer, when a configuration status of the receivers changes because at least one of a number, a location or a load of the multiple-receivers changes, the coupling effects between multiple transmitters and receivers change. However, the existing technologies for multiple-receiver wireless power transfer have a limited configuration that may ignore the coupling effects between the receivers or have a limitation that the coupling effects are assumed to be in a predetermined status. Accordingly, due to the characteristics of the wireless power transfer constituting the multiple-receivers, it is inevitable to change the configuration of the receiver in real-time. Therefore, to ensure stable and optimal operating conditions, the resonance conditions must be compensated in real-time according to changes in the receiver configuration. In order to determine the optimal resonance conditions, coupling effect information between all receivers is required, and identifying this in real-time is the basis of a real-time compensation technology for the optimal resonance conditions.

The existing coupling effect approximation technologies have not been researched and developed only for the wireless power transfer, but their methods are similar to methods used in the wireless power transfer. However, the previously required level of the coupling effect approximation technology is a single-receiver, that is, the level of a mutual inductance between single coils, and the mutual inductance between multiple coils is only a small part. First, there is a method for approximating a mutual inductance between single coils. According to this method, a measuring coil is added to the transmitter to check the status of the receiving coil. In addition, through change of current or voltage measured in the added coil of the transmitter, the change in the location of the receiving coil is identified. Specifically, the changed mutual inductance based on the voltage and current changes in the receiving coil is approximated. Through this, based on voltage and current change data of the transmitter changed according to the location of the receiving coil, the location of the receiving coil is predicted. Second, there is a method for approximating a mutual inductance between multiple coils. According to this method, a mutual inductance is sequentially approximated between multiple transmitters and receivers. Specifically, based on the method for approximating a mutual inductance between the single coils, a mutual inductance between each transmitting and receiving coils is sequentially approximated one by one. Therefore, this method has a limitation in that it may not approximate a mutual inductance between receiving coils.

As described above, the existing technologies suggest the method for approximating a mutual inductance according to the change of the receivers, but it has limitations in measuring between single transmitting and receiving coils and inability to measure the mutual inductance between the receivers.

SUMMARY

The various example embodiments propose a real-time approximation method and apparatus of a mutual inductance between transmitters and receivers for determining an optimal operating condition in a multiple-receiver wireless power transfer system.

The various example embodiments provide a computer device for a multiple-receiver wireless power transfer system including a transmitter and a plurality of receivers and a method thereof.

According to various example embodiments, the method of the computer device may include approximating a mutual inductance in the multiple-receiver wireless power transfer system according to a configuration status of the receivers, and determining an operating condition of the multiple-receiver wireless power transfer system based on the mutual inductance, and the mutual inductance may include a mutual inductance between the transmitter and the receivers, and a mutual inductance between the receivers.

According to various example embodiments, the computer device may include a memory, and a processor connected with the memory, and configured to execute at least one instruction stored in the memory, and the processor may be configured to approximate a mutual inductance in the multiple-receiver wireless power transfer system according to a configuration status of the receivers, and determine an operating condition of the multiple-receiver wireless power transfer system based on the mutual inductance, and the mutual inductance may include a mutual inductance between the transmitter and the receivers, and a mutual inductance between the receivers.

The various example embodiments may approximate a coupling effect including not only a mutual inductance between a transmitter and receivers in a multiple-receiver wireless power transfer system but also a mutual inductance between receivers. At this time, the various example embodiments may approximate a mutual inductance in the multiple-receiver wireless power transfer system based on a current change according to an operation status change in the multiple-receiver wireless power transfer system without additional measurement equipment or mapped data. Accordingly, the various example embodiments may determine an optimal operating condition of the multiple-receiver wireless power transfer system based on the mutual inductance in the multiple-receiver wireless power transfer system, and apply compensation thereto. This may lead to maximizing the efficiency of the multiple-receiver wireless power transfer system.

BRIEF DESCRIPTION OF THE DRAWINGS

These and/or other aspects, features, and advantages of the disclosure will become apparent and more readily appreciated from the following description of embodiments, taken in conjunction with the accompanying drawings of which:

FIGS. 2, 3, 4, 5, 6, and 7 are drawings for describing operation features of a multiple-receiver wireless power transfer system according to various example embodiments;

DETAILED DESCRIPTION

In case of a multiple-receiver wireless power transfer, it is necessary to compensate for an optimal operation condition according to a configuration status (at least one of a number, a location, or a load) of receivers. To compensate for the optimal operation condition, it is essential to identify a coupling effect (a mutual inductance) between transmitting and receiving coils in real-time. Therefore, various example embodiments try to approximate a mutual inductance which is changed according to the number and location of receivers with a mutual inductance between all coils based on a current change according to an operation status change without additional measurement equipment or mapped data. Particularly, unlike the existing methods, the various example embodiments approximate by considering all complex coupling status including a mutual inductance between receiving coils. Hereinafter, various example embodiments in the present disclosure will be described in detail with reference to the accompanying drawings.

Figure 1:
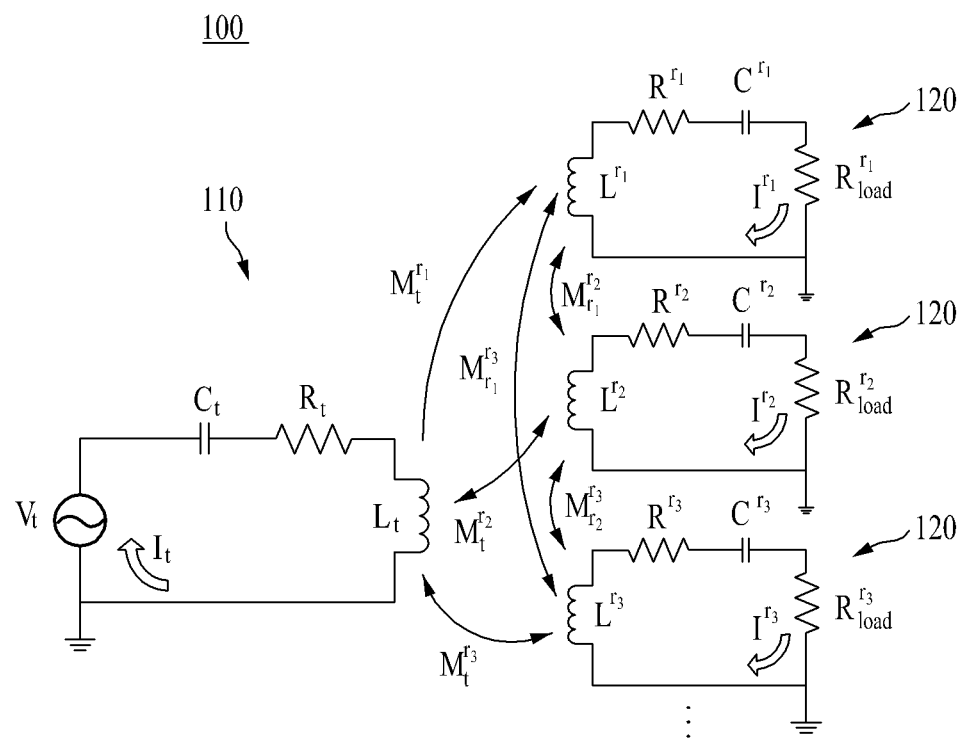
FIG. 1 is a drawing illustrating a circuit of a multiple-receiver wireless power transfer system according to various example embodiments.

FIG. 1 is a drawing illustrating a circuit of a multiple-receiver wireless power transfer system 100 according to various example embodiments. FIGS. 2, 3, 4, 5, 6, and 7 are drawings for describing operation features of the multiple-receiver wireless power transfer system 100 according to various example embodiments.

Referring to FIG. 1, the multiple-receiver wireless power transfer system 100 may include a transmitter 110 and a plurality of receivers 120. According to a configuration status of the receivers 120, there may be a coupling effect in the multiple-receiver wireless power transfer system 100. Here, the configuration status of the receivers 120 may include at least one of a number, a location, or a load of the receivers 120. In other words, according to the configuration status of the receivers 120, a mutual inductance M may be generated in the multiple-receiver wireless power transfer system 100, and accordingly, the coupling effect may be generated. Therefore, if the configuration of the receivers 120 is changed, the coupling effect may be changed in the multiple-receiver wireless power transfer system 100. Also, the coupling effect may be generated based on the mutual inductance M between receivers 120 as well as the mutual inductance M between the transmitter 110 and each of the receivers 120. At this time, the transmitter 110 and the receivers 120 may have coils for wirelessly transmitting or receiving power, respectively, and the mutual inductance M may be generated between the coils.

According to various example embodiments, according to the configuration status of the receivers 120, not only the mutual inductance M between the transmitter 110 and the receivers 120 in the multiple-receiver wireless power transfer system 100 but also the mutual inductance M between the receivers 120 may be approximated. In other words, the mutual inductance M between all coils in the multiple-receiver wireless power transfer system 100 may be approximated.

A circuit of the multiple-receiver wireless power transfer system 100 may be interpreted by Kirchhoff's voltage law consisting of a compensation capacitance C, an inductance L, a load R, and the like, as below [Equation 1]. In the below [Equation 1], X may represent a status of the load R for a particular resonance condition of the multiple-receiver wireless power transfer system 100. Therefore, when a configuration (a number, a location, and a design) of coils, the resonance condition C, L, and the load R are determined, a current I may be determined according to an input voltage V. However, in case of the mutual inductance M, it is determined according to the configuration of the coil, and this may correspond to a part that requires approximation rather than a controllable area. Accordingly, by modifying the below [Equation 1], the mutual inductance M may be expressed as an unknown as shown in below [Equation 2]. In case of the below [Equation 2], when information on the current I and the voltage V are identified, the mutual inductance M may be calculated, but since it is not a square matrix, it may be calculated through a Pseudoinverse matrix.

Here, the Pseudoinverse matrix makes it possible to calculate an inverse matrix in case of a non-square matrix. However, in case of the Pseudoinverse matrix, it is not a method to obtain an exact value, but serves to approximate a value close to the closest value (linear regression).

[Equation 1]
$$\begin{bmatrix} V_t \\ 0 \\ 0 \\ \vdots \\ 0 \end{bmatrix} = \begin{bmatrix} X_t & j\omega M_t^{r1} & j\omega M_t^{r2} & \cdots & j\omega M_t^{rn} \\ j\omega M_{r_1}^{t} & X^{r1} & j\omega M_{r_1}^{r2} & \cdots & j\omega M_{r_1}^{rn} \\ j\omega M_{r_2}^{t} & j\omega M_{r_2}^{r1} & X^{r2} & \cdots & j\omega M_{r_2}^{rn} \\ \vdots & \vdots & \vdots & \ddots & \vdots \\ j\omega M_{r_n}^{t} & j\omega M_{r_n}^{r1} & j\omega M_{r_n}^{r2} & \cdots & X^{rn} \end{bmatrix} \begin{bmatrix} I_t \\ I^{r1} \\ I^{r2} \\ \vdots \\ I^{rn} \end{bmatrix}$$

wherein, $X_t = j\omega L_1 + \frac{1}{j\omega C_t} + R_t$, $X^{ri} = j\omega L^{ri} + \frac{1}{j\omega C^{ri}} + R^{ri} + R^{ri}_{load}$

[Equation 2]
$$X = \begin{bmatrix} V_t - X_t I_t \\ -X^{r1} I^{r1} \\ -X^{r2} I^{r2} \\ \vdots \\ -X^{rn} I^{rn} \end{bmatrix} =$$

$$\begin{bmatrix} j\omega I^{r1} & j\omega I^{r2} & \cdots & j\omega I^{rn} & 0 & \cdots & 0 & 0 & \cdots & 0 & 0 & \cdots \\ j\omega I_t & 0 & 0 & 0 & j\omega I^{r2} & \cdots & j\omega^{rn} & 0 & \cdots & 0 & 0 & \cdots \\ 0 & j\omega I_t & 0 & 0 & j\omega I^{r1} & 0 & 0 & j\omega I^{r3} & \cdots & j\omega I^{rn} & 0 & \cdots \\ 0 & 0 & \ddots & 0 & 0 & \ddots & 0 & j\omega I^{r2} & 0 & 0 & j\omega I^{r4} & \cdots \\ 0 & 0 & 0 & j\omega I^{r1} & 0 & 0 & j\omega I^{r1} & 0 & \ddots & 0 & j\omega I^{r3} & \cdots \\ \vdots & \vdots & \vdots & \vdots & \vdots & \vdots & \vdots & \vdots & \vdots & \vdots & \vdots & \ddots \end{bmatrix}$$

$$\begin{bmatrix} M_t^{r1} \\ \vdots \\ M_t^{rn} \\ M_{r_1}^{r2} \\ \vdots \\ M_{r_1}^{rn} \\ M_{r_2}^{r1} \\ \vdots \\ M_{r_2}^{rn} \\ \vdots \end{bmatrix} = IM$$

Figure 2:
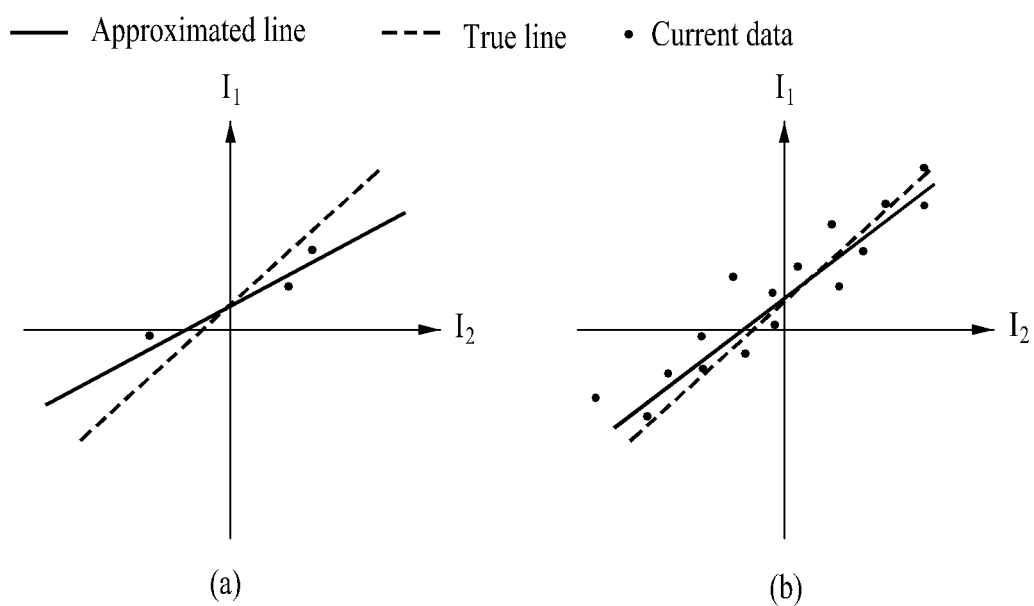

Therefore, to increase the approximation accuracy of the Pseudoinverse matrix, the various example embodiments may increase the approximation accuracy or control the approximation speed by adding current information according to the operation condition (the resonance condition, the load). FIG. 2 is a drawing for exemplarily describing approximation accuracy according to an amount of current information in the various example embodiments. As shown in FIG. 2, as current information is added, the amount of current information increases, so that approximation accuracy may be increased.

[Equation 3]
$$\begin{bmatrix} X \\ X' \\ \vdots \end{bmatrix} = \begin{bmatrix} I \\ I' \\ \vdots \end{bmatrix}$$

wherein, I and I' may represent different resonance conditions, i.e., currents measured in X and X'.

As described above, to confirm that the mutual inductance M may be approximated, an experiment was conducted while changing the number and the location of the coils of the receivers 120. FIGS. 3, 4, 5, and 6 are drawings for describing experimental results for the mutual inductance M approximation in the multiple-receiver wireless power transfer system 100 according to various example embodiments.

Figure 3:
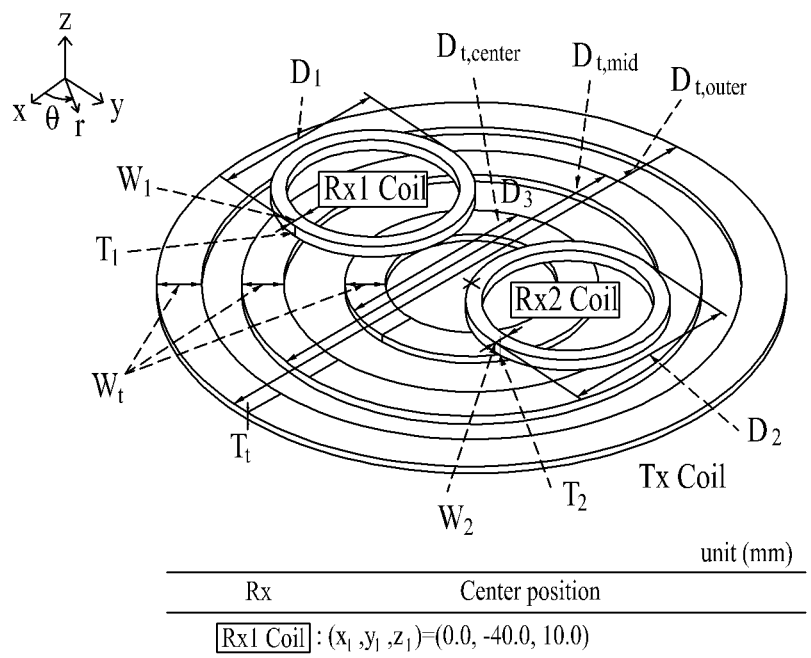
Figure 4:
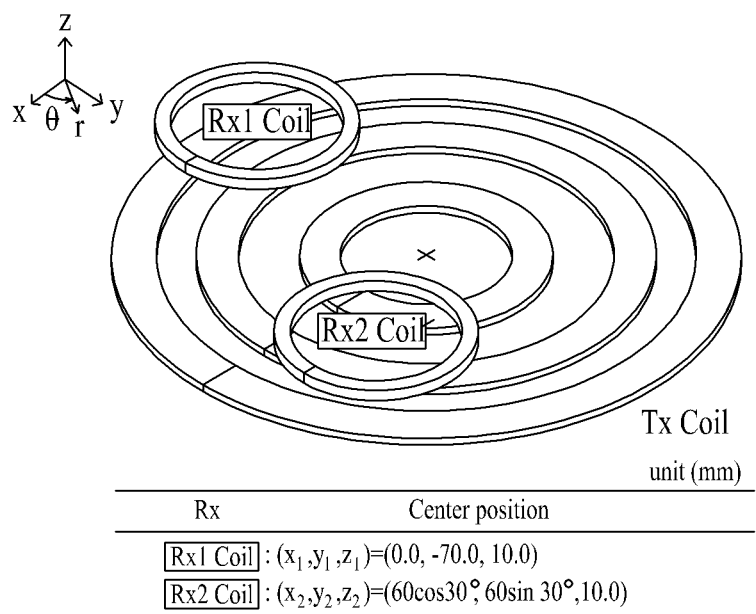
Figure 5:
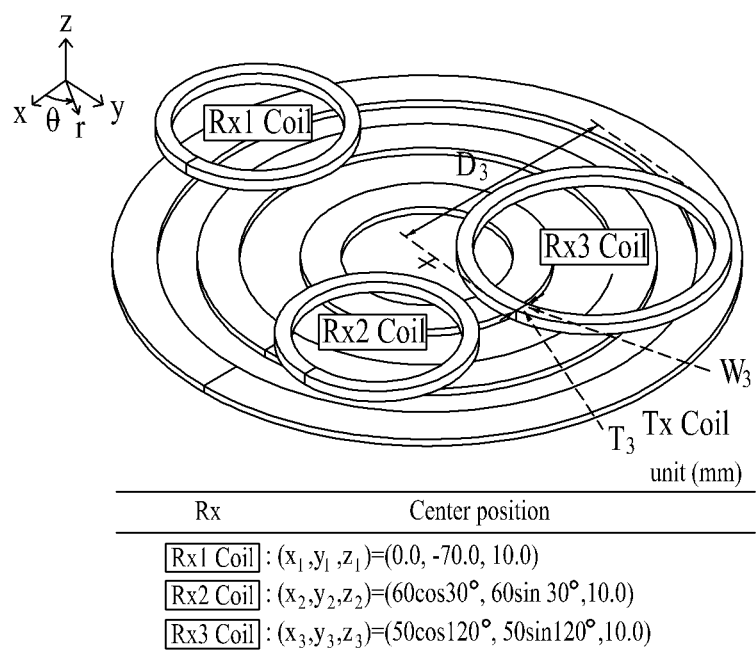

First, as shown in (a) of FIG. 3, when two receivers 120, Rx1 Coil, Rx2 Coil, are located for the transmitter 110, Tx Coil, as shown in (b) of FIG. 3, the mutual inductance M was approximated with a very small error for an actual value. Also, as shown in (a) of FIG. 4, even though the location of the two receivers 120, Rx1 Coil, Rx2 Coil, are changed, as shown in (b) of FIG. 4, the mutual inductance M was approximated with a very small error for an actual value. In addition, as shown in (a) of FIG. 5, even though another receiver 120, Rx3 Coil, is added, and the three receivers 120, Rx1 Coil, Rx2 Coil, Rx3 Coil, are located for the transmitter 110, Tx Coil, as shown in (b) of FIG. 5, the mutual inductance M was approximated with a very small error for an actual value. Here, sizes of the three receivers 120, Rx1 Coil, Rx2 Coil, Rx3 Coil, are different. Furthermore, as shown in (a) of FIG. 6, even though other two receivers, 120, Rx4 Coil, Rx5 Coil, are added for the transmitter 110, Tx Coil, and five receivers 120, Rx1 Coil, Rx2 Coil, Rx3 Coil, Rx4 Coil, Rx5 Coil, are located, as shown in (b) of FIG. 6, the mutual inductance M was approximated with a very small error for an actual value. Here, sizes of the five receivers 120, Rx1 Coil, Rx2 Coil, Rx3 Coil, Rx4 Coil, Rx5 Coil, are different. Through this, it was confirmed that the mutual inductance M may be approximated with a resolution of 0.1 uH. At this time, by adding the current information according to the operation status, the approximation resolution will be further improved.

Figure 7:
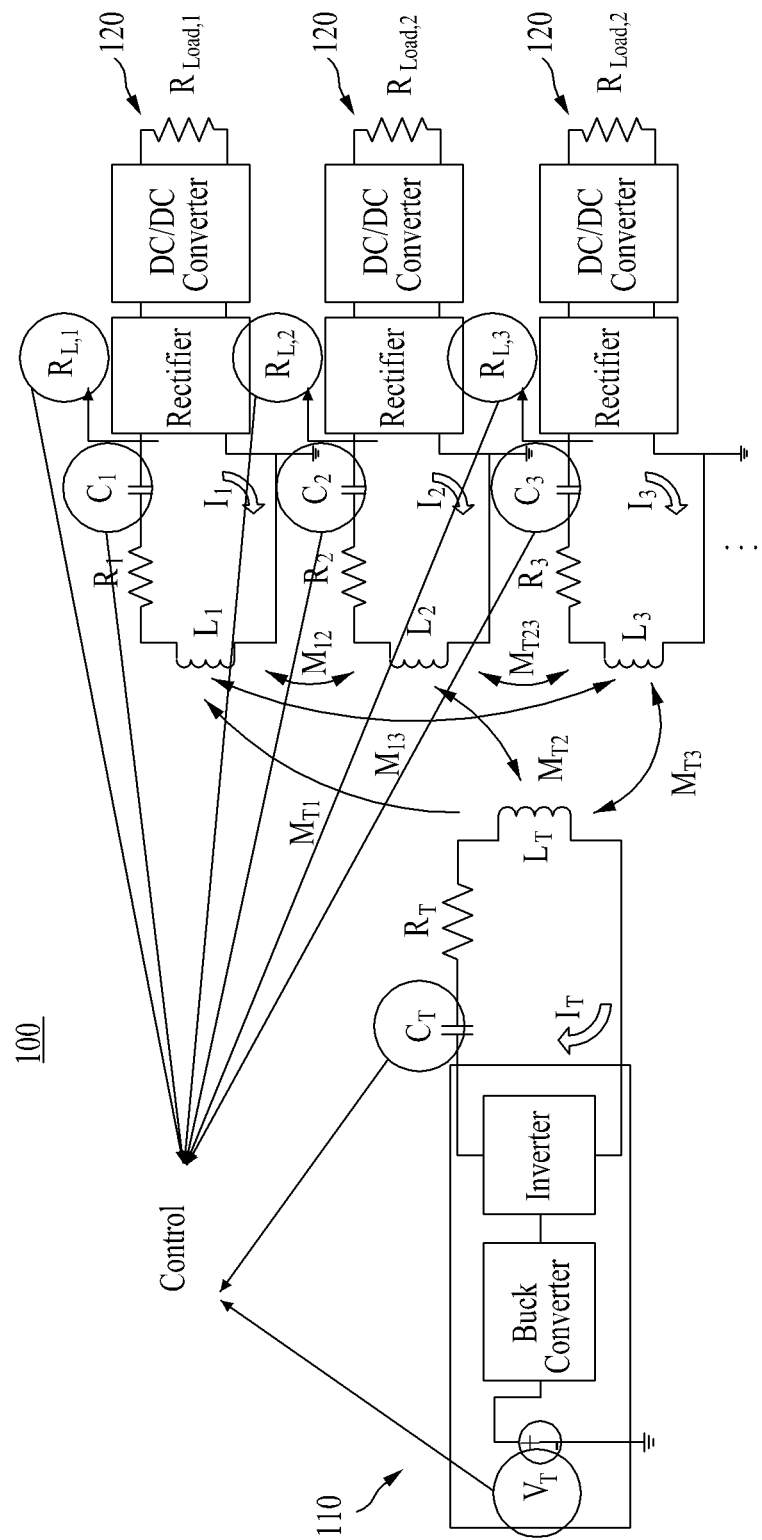

According to various example embodiments, based on the mutual inductance M in the multiple-receiver wireless power transfer system 100, an optimal operation status of the multiple-receiver wireless power transfer system 100 may be determined. Through this, for the multiple-receiver wireless power transfer system 100, the resonance condition may be optimally compensated so that the optimal operation status is ensured. In other words, the resonance condition of at least one of the transmitter 110 or the receivers 120 may be controlled. FIG. 7 is a drawing for exemplarily describing an operation condition control of the multiple-receiver wireless power transfer system 100 according to various example embodiments. For example, as shown in FIG. 7, at least one of an input voltage or a capacitance of the transmitter 110 may be controlled, or at least one of a capacitance or a load of the receivers 120 may be controlled.

Figure 8:
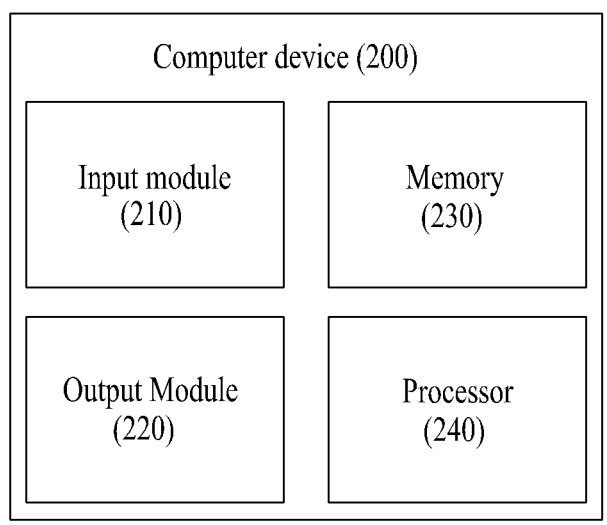
FIG. 8 is a drawing illustrating schematically a configuration of a computer device according to various example embodiments.

FIG. 8 is a drawing illustrating schematically a configuration of a computer device 200 according to various example embodiments.

Referring to FIG. 8, the computer device 200, which is for the multiple-receiver wireless power transfer system 100, may include at least one of an input module 210, an output module 220, a memory 230, or a processor 240. According to one example embodiment, the computer device 200 may be implemented separately from the transmitter 110 and the receivers 120, and be configured to drive in communication with the transmitter 110 and the receivers 120. According to another example embodiment, the computer device 200 may be implemented to be combined with the transmitter 110, and be configured to drive in communication with the transmitter 110 and the receivers 120. According to another example embodiment, the computer device 200 may be implemented to be combined with one of the receivers 120, and be configured to drive in communication with the transmitter 110 and the receivers 120. In some example embodiments, at least one of the elements of the computer device 200 may be omitted, and at least another element may be added. In some example embodiments, at least two of the elements of the computer device 200 may be implemented as one integrated circuit.

The input module 210 may input signals to be used to at least one element of the computer device 200. The input module 210 may include at least one of an input device configured to directly input signals to the computer device 200 by a user, a sensor device configured to generate signals by sensing changes in the surroundings, or a receiving device configured to receive signals from external devices. For example, the input device may include at least one of a microphone, a mouse, or a keyboard. In some example embodiments, the input device may include at least one of a touch circuitry set to sense touch or a sensor circuitry set to measure force generated by touch.

The output module 220 may output information to the outside of the computer device 200. The output module 220 may include at least one of a display device configured to output information visually, an audio output device which may output information into audio signals, or a transmitting device which may transmit information wirelessly. For example, the display device may include at least one of a display, a hologram device, or a projector. As one example, the display device may be assembled with at least one of the touch circuitry or the sensor circuitry of the input module 210, and implemented in a touch screen. For example, the audio output device may include at least one of a speaker or a receiver.

According to one example embodiment, the receiving device and the transmitting device may be implemented as a communication module. The communication module may perform communication with external devices in the computer device 200. The communication module may set a communication channel between the external devices with the computer device 200, and perform communication with the external devices through the communication channel. Here, the external devices may include at least one of a vehicle, a satellite, a base station, a server, or another computer system. The communication module may include at least one of a wired communication module or a wireless communication module. The wired communication module may be connected via wires to an external device and communicate with it via wires. The wireless communication module may include at least one of a short-range communication module or a long-range communication module. The short-range communication module may communicate with an external device by a short-range communication method. The short-range communication method may include, for example, at least one of Bluetooth, WiFi direct, and Infrared data association (IrDA). The long-range communication module may communicate with an external device by a long-range communication method. Here, the long-range communication module may communicate with an external device through a network. The network may include, for example, at least one of a cellular network, the Internet, and a computer network such as LAN (local area network) or WAN (wide area network).

The memory 230 may store various data used by at least one element of the computer device 200. The memory 230 may include, for example, at least one of volatile memory and nonvolatile memory. The data may include at least one program and input data or output data associated therewith. The program may be stored as software including at least one instruction in the memory 230, and may include, for example, at least one of an operating system, middleware, or an application.

The processor 240 may execute the program of the memory 230 and control at least one element of the computer device 200. Through this, the processor 240 may perform data processing or calculation. At this time, the processor 240 may execute the instructions stored in the memory 230.

According to various example embodiments, the processor 240 may approximate the mutual inductance M in the multiple-receiver wireless power transfer system 100 according to the configuration status of the receivers 120. The mutual inductance M in the multiple-receiver wireless power transfer system 100 may include the mutual inductance M between the transmitter 110 and the receivers 120, and the mutual inductance M between the receivers 120. At this time, the processor 240 may approximate the mutual inductance M based on the current change according to the operation status change in the multiple-receiver wireless power transfer system 100. Here, the configuration status of the receivers 120 may include at least one of the number, the location, or the load of the receivers 120.

According to various example embodiments, the processor 240 may determine an optimal operating condition of the multiple-receiver wireless power transfer system 100 based on the mutual inductance M in the multiple-receiver wireless power transfer system 100. Accordingly, the processor 240 may control the resonance condition of the multiple-receiver wireless power transfer system 100 to ensure the operating condition. According to one example embodiment, the resonance condition of the multiple-receiver wireless power transfer system 100 may include at least one of the voltage input to the transmitter 110 or the capacitance of the transmitter 110. According to another example embodiment, the resonance condition of the multiple-receiver wireless power transfer system 100 may include at least one of the capacitance or the load of the receivers 120.

Figure 9:
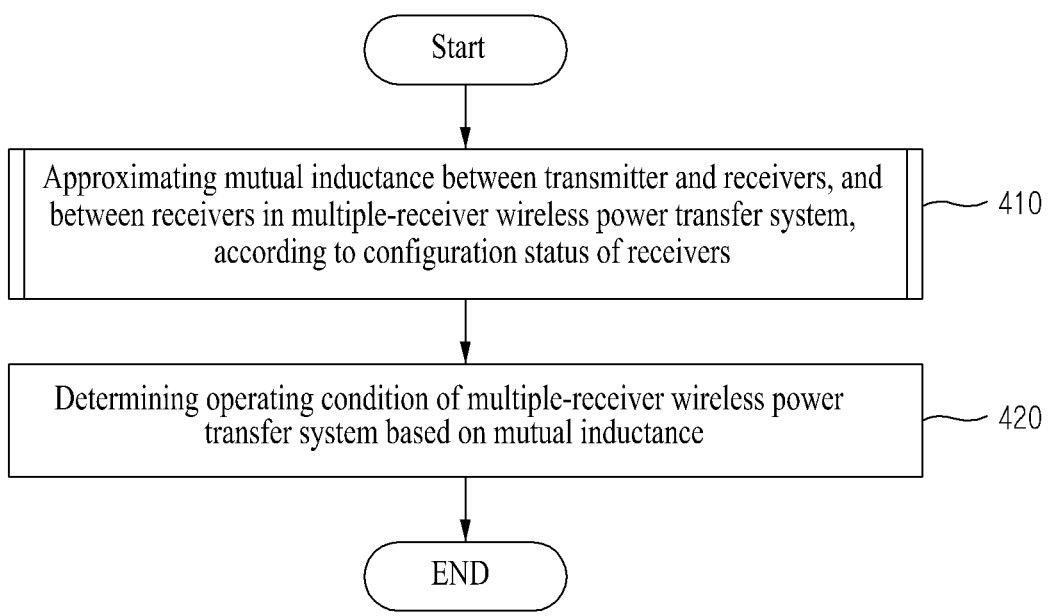
FIG. 9 is a drawing illustrating schematically a method of a computer device according to various example embodiments.

FIG. 9 is a drawing illustrating schematically a method of the computer device 200 according to various example embodiments.

Referring to FIG. 9, the computer device 200 may approximate the mutual inductance M in the multiple-receiver wireless power transfer system 100 according to the configuration status of the receivers 120 in Step 410. The mutual inductance M in the multiple-receiver wireless power transfer system 100 may include the mutual inductance M between the transmitter 110 and the receivers 120, and the mutual inductance M between the receivers 120. At this time, the processor 240 may approximate the mutual inductance M based on the current change according to the operation status change in the multiple-receiver wireless power transfer system 100. This will be described in more detail below with reference to FIG. 10.

Figure 10:
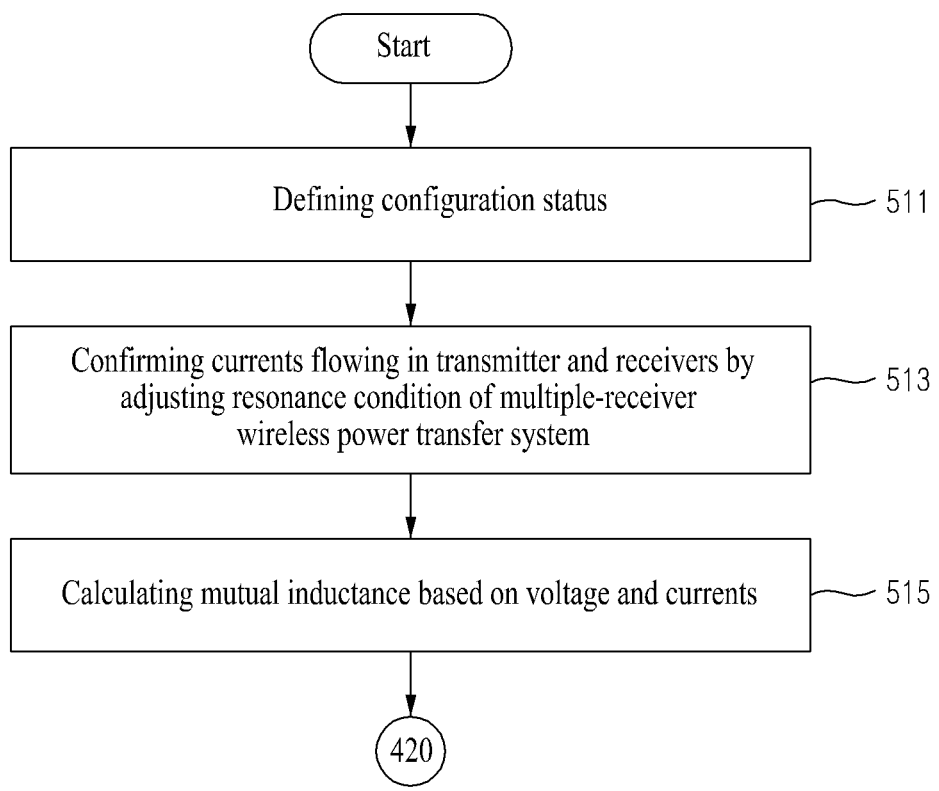
FIG. 10 is a drawing illustrating a detailed configuration of approximating a mutual inductance in the multiple-receiver wireless power transfer system of FIG. 9.

FIG. 10 is a drawing illustrating a detailed configuration of the approximating the mutual inductance M (Step 410) in the multiple-receiver wireless power transfer system 100 of FIG. 9.

Referring to FIG. 10, the computer device 200 may define the configuration status of the receivers 120 in Step 511. Here, the configuration status of the receivers 120 may include at least one of the number, the location, or the load of the receivers 120. In particular, the processor 240 may detect the configuration status of the receivers 120 through the input module 210. As one example, the processor 240 may detect the configuration status of the receivers 120 through the sensor device. As another example, the processor 240 may receive the configuration status of the receivers 120 through the communication module.

Next, the computer device 200 may confirm the current change according to the operation status change in the multiple-receiver wireless power transfer system 100 in Step 513. At this time, the processor 240 may adjust the resonance condition of the multiple-receiver wireless power transfer system 100, and confirm currents flowing in the transmitter 110 and the receivers 120. According to one example embodiment, the resonance condition of the multiple-receiver wireless power transfer system 100 may include at least one of the voltage input to the transmitter 110 or the capacitance of the transmitter 110. According to another example embodiment, the resonance condition of the multiple-receiver wireless power transfer system 100 may include at least one of the capacitance or the load of the receivers 120. Particularly, the processor 240 may detect the resonance condition and the currents through the input module 210. As another example, the processor 240 may receive information for the resonance condition and the currents through the communication module.

Next, the computer device 200 may calculate the mutual inductance M in the multiple-receiver wireless power transfer system 100 based on the current change according to the operation status change in the multiple-receiver wireless power transfer system 100 in Step 515. Particularly, the processor 240 may calculate the mutual inductance M in the multiple-receiver wireless power transfer system 100 based on the resonance condition and the currents flowing in the transmitter 110 and the receivers 120 corresponding thereto. After this, the computer device 200 may return to FIG. 9, and proceed with Step 420.

Referring to FIG. 9 again, the computer device 200 may determine the optimal operating condition of the multiple-receiver wireless power transfer system 100 based on the mutual inductance M in the multiple-receiver wireless power transfer system 100 in Step 420. Accordingly, the processor 240 may control the resonance condition of the multiple-receiver wireless power transfer system 100 to ensure the operating condition. According to one example embodiment, the resonance condition of the multiple-receiver wireless power transfer system 100 may include at least one of the voltage input to the transmitter 110 or the capacitance of the transmitter 110. According to another example embodiment, the resonance condition of the multiple-receiver wireless power transfer system 100 may include at least one of the capacitance or the load of the receivers 120.

The various example embodiments may approximate not only the mutual inductance M between the transmitter 110 and the receivers 120 in the multiple-receiver wireless power transfer system 100 but also the coupling effect including the mutual inductance M between the receivers 120. At this time, the various example embodiments may approximate the mutual inductance M in the multiple-receiver wireless power transfer system 100 based on the current change according to the operation status change in the multiple-receiver wireless power transfer system 100 without additional measurement equipment or mapped data. Accordingly, the various example embodiments may determine the optimal operating condition of the multiple-receiver wireless power transfer system 100 based on the mutual inductance M in the multiple-receiver wireless power transfer system 100, and may apply compensation thereto. This may lead to maximizing the efficiency of the multiple-receiver wireless power transfer system 100.

The technology according to various example embodiments may be applied to a multiple-transmitter and receiver wireless charging system. In order to overcome the limitation of the air gap, which is a disadvantage of a magnetic induction type wireless power transfer system, a magnetic resonance type wireless power transfer method having high efficiency even in relatively large air gap is being studied a lot. In order to maximize consumer convenience and reduce infrastructure costs, expansion to the multiple-receiver wireless power transfer system is required, and to implement this, a system for recalibrating a resonance condition according to change in the number and location of the receivers is needed. The technology (discrete variation passive element technology) according to various example embodiments may be easily implemented to identify a coupling effect for recalibrating such resonance condition, and it is also easy to expand and apply to various target systems (electric autonomous vehicles, drones, etc.). First, the technology according to the various example embodiments may be applied to wireless charging while parking electric vehicles. In this case, when charging multiple electric vehicles at the same time, a multiple-coupling effect (a mutual inductance) may be identified in real-time so that the charging infrastructure (an inverter, a converter, etc.) may be used efficiently. Particularly, the coupling effect may be identified when the charging environment is changed due to a change in the number of vehicles or misalignment. Second, the technology according to various example embodiments may be applied to electric drones. Recently, drones are used in various fields such as delivery service, filming, and fire suppression, and the like, but the operating hours are limited due to problems such as battery capacity. For the stable use of drones, a charging place is absolutely necessary in the relay area, and more effective operation is possible in connection with wireless charging. Particularly, when recalibration of the resonance condition is required due to changes in weather conditions and driving environments, the coupling change situation is identified through the technology according to various example embodiments. In addition, the technology according to various example embodiments may be utilized for various unmanned products. For example, the technology according to various example embodiments may be utilized for multiple-wireless charging of various unmanned and wireless electronic products, such as unmanned vacuum cleaners, unmanned logistics robots, mobile phones, and tablet PCs, etc.

Meanwhile, the technology according to various example embodiments may be applied to other various wireless charging fields. In various wireless charging fields such as cell phones, medical electronic devices in the body, and the like, if the resonance place is misaligned, efficiency is lowered or power transfer is impossible. Particularly, as the misalignment of the location increases, the magnetic field may flow to undesired location, and leakage of magnetic flux may increase and adversely affect the device or human body sensitive to electromagnetic fields. Therefore, it is important to maintain an efficient and stable wireless power transfer status by matching the optimal resonance by identifying the status (the location, and the coupling situation) and the like of the receivers. In case that the technology according to various example embodiment is applied, it is possible to compensate for the optimal resonance condition by determining the alignment and location between the transmitter and receiver related by identifying the location or coupling situation in real-time without a separate sensor. In addition, applications in other electromagnetic field systems are possible.

The technology according to various example embodiments is expected to be effective in various aspects. First, the technology according to various example embodiments is expected to be effective in a technical aspect. The existing magnetic resonance type wireless power transfer study has focused on a system consisting of a single transmitter and receiver, but if the technology according to various example embodiments is used, the expansion to a magnetic resonance type system consisting of multiple transmitters and receivers will be provided. When constructing the magnetic resonance type system consisting of multiple transmitters and receivers, the coupling situation is updated in real-time to efficiently supply power to multiple receivers with one or a few transmitters, and through this, utilization and implementation of wireless power transfer consisting of multiple transmitters and receivers may be raised. When autonomous driving and wireless power transfer technology applied with the technology according to various example embodiments are combined, it is possible to approximate the coupling effect in real-time for efficient and stable power supply, so the technicality and marketability of unmanned products such as unmanned vacuum cleaners and unmanned driving logistics robots are expected to be expanded. Second, the technology according to various example embodiments is expected to be effective in economic and industrial aspects. A typical example of the unmanned and automated is drones, and it currently has economic value in various fields. However, since the flight time of the drones is limited due to the limitation of the battery, there are currently limitations in terms of logistics and control. Therefore, if it is possible to stably supply power through wireless charging, the availability of the drones will be further increased, and accordingly, new markets and additional market expansion may be expected. Currently, the wireless power transfer system has started to be introduced to electric vehicle charging, and since the wireless power transfer will be continuously applied in various other fields, the technology according to various example embodiments is expected to have great economic value.

The aforementioned method may be provided as a computer program recorded on a computer-readable recording medium in order to be executed in a computer. The medium may continue to store a program executable by a computer or may temporarily store the program for execution or download. Furthermore, the medium may be various recording means or storage means having a form in which one or a plurality of pieces of hardware has been combined. The medium is not limited to a medium directly connected to a computer system, but may be one distributed over a network. Examples of the medium may be magnetic media such as a hard disk, a floppy disk and a magnetic tape, optical media such as a CD-ROM and a DVD, magneto-optical media such as a floptical disk, and media configured to store program instructions, including, a ROM, a RAM, and a flash memory. Furthermore, other examples of the medium may include recording media and/or storage media managed in an app store in which apps are distributed, a site in which various other pieces of software are supplied or distributed, a server, etc.

The methods, operations or schemes of this disclosure may be implemented by various means. For example, such schemes may be implemented as hardware, firmware, software, or a combination of them. Those skilled in the art will understand that various exemplary logical blocks, modules, circuits, and algorithm steps described in association with the present disclosure may be implemented as electronic hardware, computer software, or combinations of them. In order to clearly describe such a mutual substitution of hardware and software, various exemplary components, blocks, modules, circuits, and steps have been generally described above from their functional viewpoints. Whether such a function is implemented as hardware or implemented as software is different depending on design requirements assigned to a specific application and the entire system. Those skilled in the art may implement a function described in various manners for each specific application, but such implementations should not be construed as departing from the scope of this disclosure.

In a hardware implementation, processing units used to perform schemes may be implemented within one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform functions described in this disclosure, a computer, or a combination of them.

Accordingly, various exemplary logical blocks, modules, and circuits described in association with this disclosure may be implemented or performed as a general-purpose processor, a DSP, an ASIC, an FPGA or another programmable logical device, a discrete gate or transistor logic, discrete hardware components or a given combination of them designed to perform functions described in the present disclosure. The general-purpose processor may be a microprocessor, but alternatively, the processor may be a given conventional processor, controller, microcontroller, or state machine. Furthermore, the processor may be implemented as a combination of computing devices, for example, a DSP and a microprocessor, a plurality of microprocessors, one or more microprocessors associated with a DSP core, or a combination of given other components.

In firmware and/or software implementation, schemes may be implemented as instructions stored in a computer-readable medium, such as a random access memory (RAM), a read-only memory (ROM), a non-volatile random access memory (NVRAM), a programmable read-only memory (PROM), an erasable programmable read-only memory (EPROM), an electrically erasable PROM (EEPROM), a flash memory, a compact disc (CD), a magnetic or optical data storage device. The instructions may be executed by one or more processors and may enable a processor(s) to perform specific aspects of a function described in this disclosure.

The aforementioned embodiments have been described as using aspects of the subject matter now disclosed in one or more independent computer systems, but this disclosure is not limited thereto and may be implemented in association with a network or a given computing environment, such as a distributed computing environment. Furthermore, in this disclosure, aspects of the subject matter may be implemented in a plurality of processing chips or devices, and storage may be similarly influenced in a plurality of devices. Such devices may include PCs, network servers, and portable devices.

Although this disclosure has been described in relation to some embodiments, the disclosure may be modified and changed in various ways without departing from the scope of this disclosure which may be understood by those skilled in the art to which an invention of this disclosure belongs. Furthermore, such a modification and change should be considered as belonging to the scope of the claims appended in the specification.

The invention claimed is:

1. A computer-implemented method for determining an optimal operating condition in a multiple-receiver wireless power transfer system, the multiple-receiver wireless power transfer system including a transmitter and a plurality of receivers, the method comprising:
    receiving a configuration status of the plurality of receivers;
    approximating a mutual inductance in the multiple-receiver wireless power transfer system according to the configuration status of the receivers;
    determining an optimal operating condition of the multiple-receiver wireless power transfer system based on the mutual inductance,
    wherein the mutual inductance comprises:
        a mutual inductance between the transmitter and the receivers, and
        a mutual inductance between the receivers,
    recalibrating a resonance condition of the multiple receiver wireless power transfer system, and
    compensating, simultaneously, the multiple-receiver wireless power transfer system to ensure optimal operation of the multiple-wireless power transfer system,
    wherein the approximating of the mutual inductance comprises:
        adjusting an operating condition of the multiple-receiver wireless power transfer system under the configuration status, the adjustment of the operating condition including an adjustment of the resonance condition of the multiple-receiver wireless power transfer system, and the adjusted resonance condition including at least one of a voltage inputted to the transmitter, a capacitance of the transmitter, or a capacitance or a load of the receivers;
        determining current change of the multiple-receiver wireless power transfer system in accordance with changes in the operating condition by determining currents flowing in the transmitter and the receivers system in accordance with the adjustment of the operating condition; and
        calculating the mutual inductance based on the determined current change.

2. The method of claim 1, wherein the configuration status comprises at least one of a number, a location, or a load of the receivers.

3. The method of claim 1, wherein the computer device is implemented separately from the transmitter and the receivers, and is configured to drive, in communication with the transmitter and the receivers.

4. The method of claim 1, wherein the computer device is implemented to be combined with the transmitter or combined with one of the receivers, and is configured to drive, in communication with the transmitter and the receivers.

5. A computer device for a multiple-receiver wireless power transfer system including a transmitter and a plurality of receivers, comprising:
    a memory; and
    a processor connected with the memory, and configured to execute at least one instruction stored in the memory, and
    wherein the processor is configured to:
        receive a configuration status of the plurality of receivers
        approximate a mutual inductance in the multiple-receiver wireless power transfer system according to the configuration status of the receivers; and
        determine an optimal operating condition of the multiple-receiver wireless power transfer system based on the mutual inductance,
        wherein the mutual inductance comprises:
            a mutual inductance between the transmitter and the receivers, and
            a mutual inductance between the receivers, and
        recalibrate a resonance condition of the multiple receiver wireless power transfer system, and
        compensate, simultaneously, the multiple-receiver wireless power transfer system to ensure optimal operation of the multiple-wireless power transfer system,
        wherein the processor is configured to approximate the mutual inductance by:
            adjusting an operating condition of the multiple-receiver wireless power transfer system under the configuration status, the adjustment of the operating condition including an adjustment of the resonance condition of the multiple-receiver wireless power transfer system, and the adjusted resonance condition including at least one of a voltage inputted to the transmitter, a capacitance of the transmitter, or a capacitance or a load of the receivers;
            determining current change of the multiple-receiver wireless power transfer system in accordance with changes in the operating condition by determining currents flowing in the transmitter and the receivers system in accordance with the adjustment of the operating condition; and
            calculating the mutual inductance based on the determined current change.

6. The computer device of claim 5, wherein the configuration status comprises at least one of a number, a location, or a load of the receivers.

7. The computer device of claim 5, wherein the computer device is implemented separately from the transmitter and the receivers, and is configured to drive, in communication with the transmitter and the receivers.

8. The computer device of claim 5, wherein the computer device is implemented to be combined with the transmitter or combined with one of the receivers, and is configured to drive, in communication with the transmitter and the receivers.

9. A non-transitory computer-readable medium for recording at least one program for executing a method for determining an optimal operating condition in a multiple-receiver wireless power transfer system including a transmitter and a plurality of receivers, wherein the method comprises:
receiving a configuration status of the plurality of receivers;
approximating a mutual inductance in the multiple-receiver wireless power transfer system according to the configuration status of the receivers;
determining an optimal operating condition of the multiple-receiver wireless power transfer system based on the mutual inductance,
wherein the mutual inductance comprises:
a mutual inductance between the transmitter and the receivers, and
a mutual inductance between the receivers
recalibrating a resonance condition of the multiple receiver wireless power transfer system, and compensating, simultaneously, the multiple-receiver wireless power transfer system to ensure optimal operation of the multiple-wireless power transfer system,
wherein the approximating of the mutual inductance comprises:
adjusting an operating condition of the multiple-receiver wireless power transfer system under the configuration status, the adjustment of the operating condition including an adjustment of the resonance condition of the multiple-receiver wireless power transfer system, and the adjusted resonance condition including at least one of a voltage inputted to the transmitter, a capacitance of the transmitter, or a capacitance or a load of the receivers;
determining current change of the multiple-receiver wireless power transfer system in accordance with changes in the operating condition by determining currents flowing in the transmitter and the receivers system in accordance with the adjustment of the operating condition; and
calculating the mutual inductance based on the determined current change.

* * * * *